United States Patent [19]

Ikeda et al.

[11] Patent Number: 5,654,767
[45] Date of Patent: Aug. 5, 1997

[54] DIGITAL CHROMINANCE SIGNAL DEMODULATING DEVICE

[75] Inventors: Tomoaki Ikeda; Kazuhiko Yawata, both of Amagasaki, Japan

[73] Assignee: Mitsubishi Denki Kabushiki Kaisha, Tokyo, Japan

[21] Appl. No.: 443,762

[22] Filed: May 18, 1995

[30] Foreign Application Priority Data

May 23, 1994 [JP] Japan .................. 6-108314

[51] Int. Cl.$^6$ ............................ H04N 9/45; H04N 9/66
[52] U.S. Cl. ..................... 348/638; 348/641; 348/726; 348/507
[58] Field of Search ......................... 348/641, 642, 348/727, 726, 507, 508, 638, 639; H04N 9/45, 9/66

[56] References Cited

U.S. PATENT DOCUMENTS

| | | |
|---|---|---|
| 3,591,707 | 7/1971 | Abbott ........................ 348/641 |
| 4,333,104 | 6/1982 | Geller ........................ 348/641 |
| 4,933,749 | 6/1990 | Van Lammeren et al. ............. 348/641 |
| 5,396,294 | 3/1995 | Fujii et al. ........................ 348/641 |
| 5,459,524 | 10/1995 | Cooper ........................ 348/507 |

FOREIGN PATENT DOCUMENTS

54891  3/1988  Japan .

*Primary Examiner*—Michael H. Lee
*Assistant Examiner*—Glenton B. Burgess

[57] ABSTRACT

In a digital chrominance signal demodulating device receiving a carrier chrominance signal obtained by digitizing an analog composite video signal, a frequency component near the horizontal frequency of the color subcarrier is extracted, and color-difference signals are output. An identifying circuit forms a selection signal for identifying one of the color-difference signals contained in the carrier chrominance signal, within a color burst signal period, on the basis of a system clock and a horizontal sync signal. A selecting circuit selects the color-difference signals on the basis of the selection signal. The color-difference signals obtained by sampling in accordance with the system clock are kept in phase with the color burst signal. Accordingly, the digital chrominance signal can be demodulated by the use of less expensive digital circuits.

20 Claims, 13 Drawing Sheets

FIG. 12A PRIOR ART CP1 (fsc)

FIG. 12B PRIOR ART CP2 (4fsc)

FIG. 12C PRIOR ART CP3 (4fsc)

DIGITAL CHROMINANCE SIGNAL DEMODULATING DEVICE

BACKGROUND OF THE INVENTION

1. Field of the Invention

The present invention relates to a digital chrominance signal demodulating device used in a color television set or the like.

2. Description of the Background Art

A chrominance demodulating circuit used in a color television set is for processing a carrier chrominance signal and a color subcarrier to produce color-difference signals. Chrominance demodulating circuits are conventionally formed of analog circuits, but are now often formed of digital circuits with the advent of signal processing technology.

Figure 11:
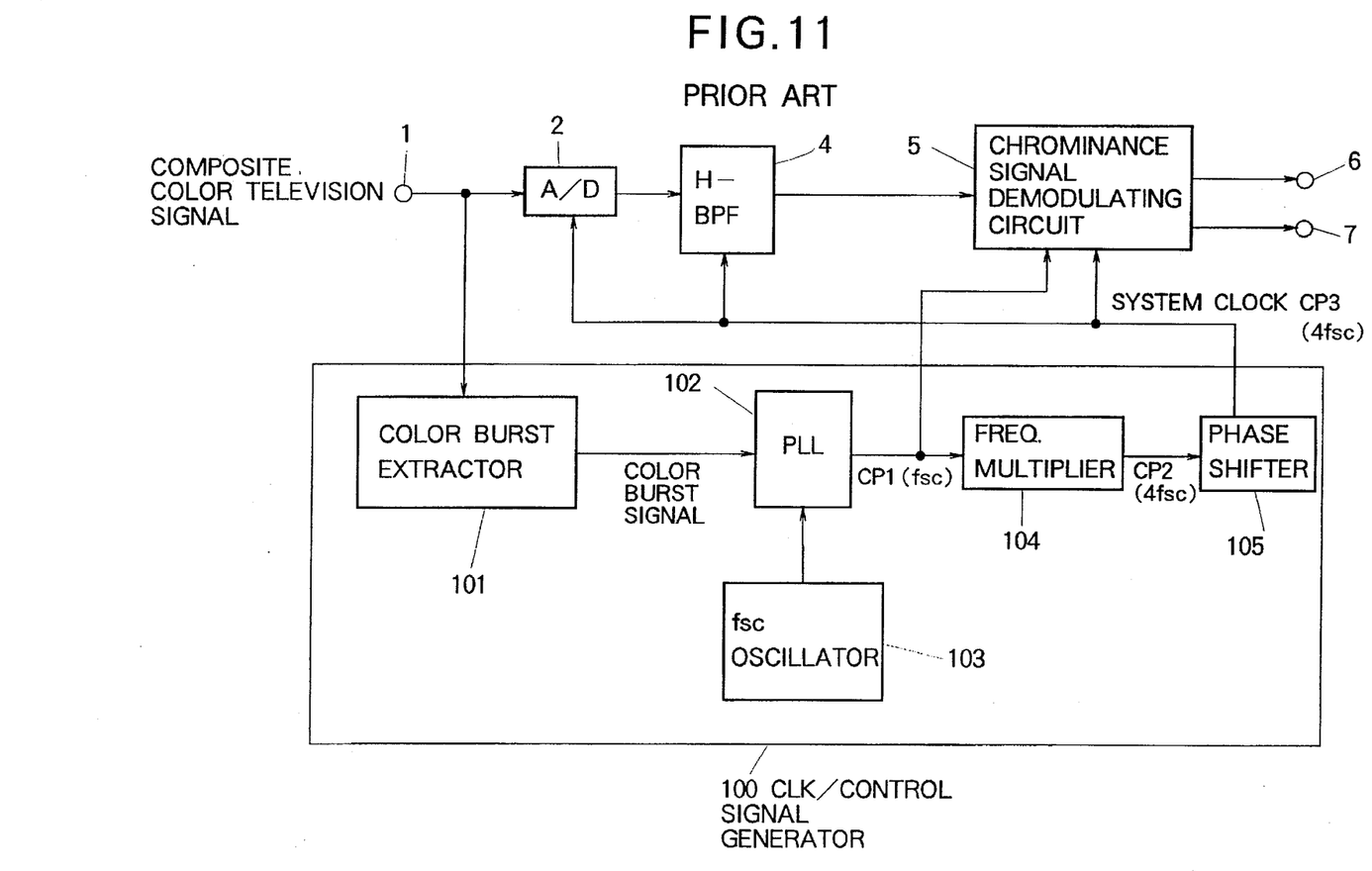
FIG. 11 is a block diagram showing the configuration of a conventional chrominance signal demodulating device.

FIG. 11 shows an example of a digital signal demodulating circuit for an NTSC color television signal. An analog composite color television signal received at an input terminal 1 is supplied to an A/D converter 2, where the analog signal is converted into a digital signal, and to a clock/control signal generator 100 for generating clocks and control signals used for digital chrominance signal demodulation. The digital signal output from the A/D converter 2 is input to a horizontal bandpass filter (HBPF) 4 for extracting the frequency components centered on and near the horizontal frequency fsc of the color subcarrier. The signal from the HBPF 4 is supplied, as a carrier chrominance signal, to a chrominance demodulating circuit 5, which outputs color-difference signals via output terminals.

The clock/control signal generator 100 processes the composite color television signal using analog circuits, to generate clock pulses CP1 having a frequency fsc and system clock pulses CP3 having a frequency 4 fsc which are both in phase with the color burst signal. The system clock pulses CP3 are supplied to the A/D converter 2, the HBPF 4 and the chrominance demodulating circuit 5.

Figure 12A:
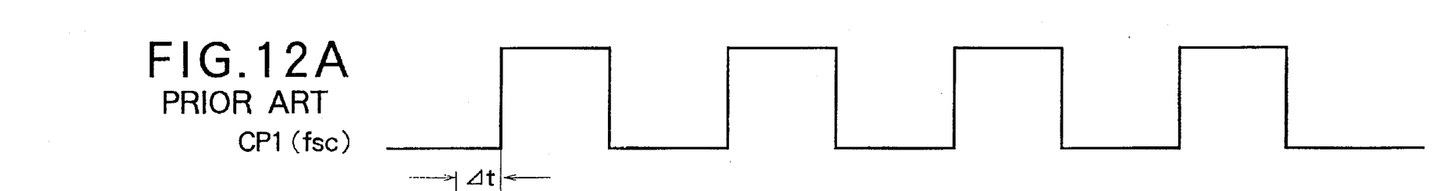
Figure 12B:
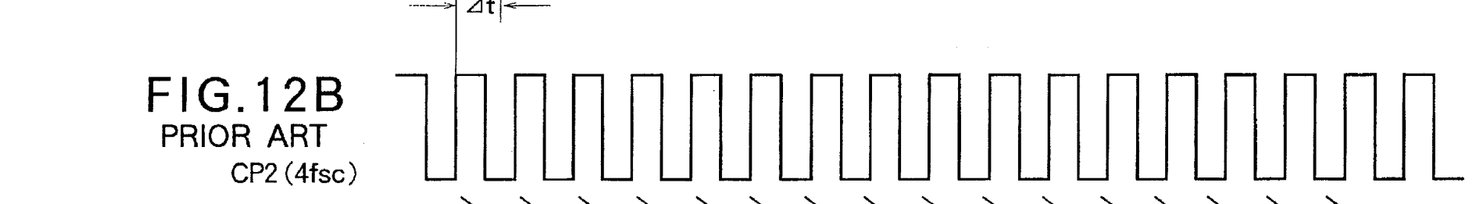
Figure 12C:
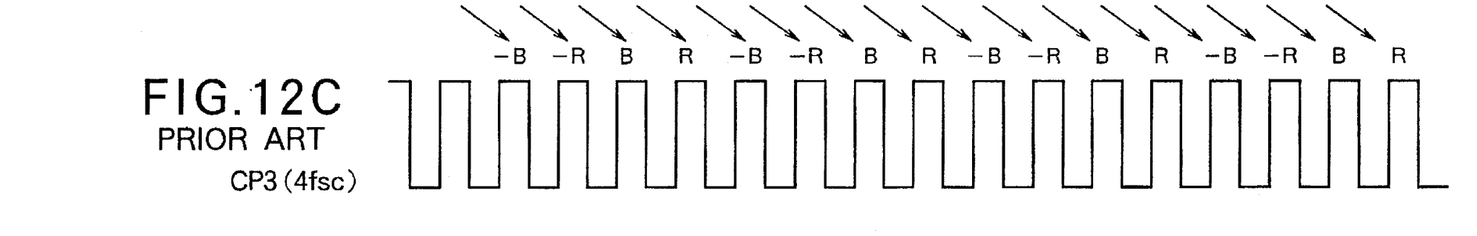

FIG. 12A to FIG. 12C show the timing of the chrominance signal demodulation. The digitized composite color television signal from the A/D converter 2 is passed through the HBPF 4 to the chrominance demodulating circuit 5, which also receives the system clock CP3 and the clock pulses CP1. In the case of the NTSC composite color television signal, the frequency fsc of the color subcarrier is fixed at about 3.58 MHz (3.579545 MHz), so that the clock/control signal generator 100 performs the following phase control in order to make the system clock CP3 and the clock pulses CP1 in phase with the color subcarrier.

The composite color television signal input to the clock/control signal generator 100 is supplied to a color burst extractor 101, where a color burst signal is extracted from the composite color television signal. The color burst signal is supplied to a PLL circuit 102, which is also supplied with an output of a frequency fsc from an fsc oscillator 103, and generates clock pulses CP1 (shown in FIG. 12A) of the same frequency and in phase with the color burst signal. The clock pulses CP1 are supplied to a chrominance signal demodulating circuit 5 and to a frequency multiplier 104, which generates clock pulses CP2 (FIG. 12B) of about 4 fsc=14.32 MHz. Because of delays in analog components, the clock pulses CP2 are not necessarily in phase with the color burst signal.

Figure 13A:
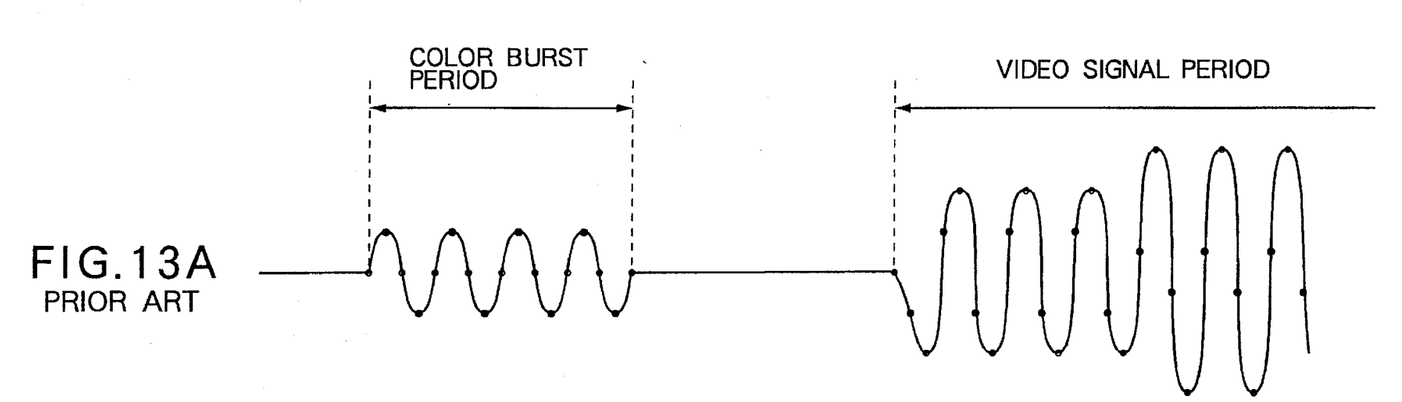
Figure 13B:
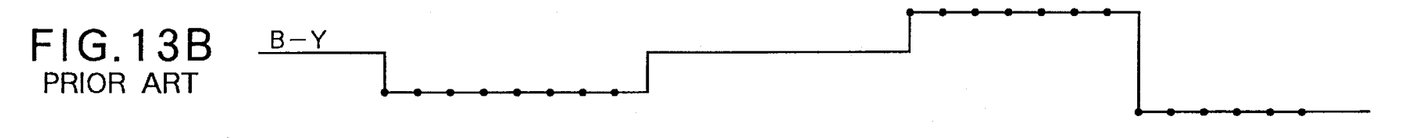
Figure 13C:
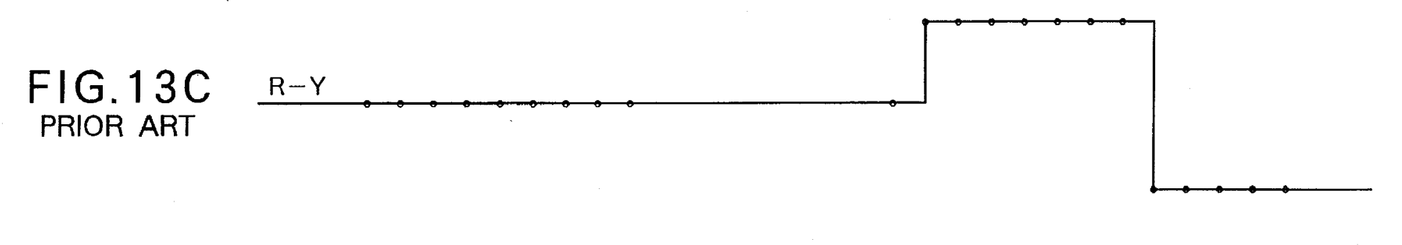

A phase shifter 105 receiving the output of the frequency multiplier 104 phase-shifts the clock pulses CP2 by means of analog circuits to produce a system clock CP3 (FIG. 12C) which is in phase with the color burst signal. The chrominance signal demodulating circuit 5 uses the system clock CP3 as sampling pulses, and extracts color-difference signal data -(B-Y), -(R-Y), (B-Y) and (R-Y) from the digitized carrier chrominance signal shown in FIG. 13A. The solid circles in FIG. 13A to FIG. 13C indicate the samples extracted for (B-Y) signals, and blank circles in FIG. 13A to FIG. 13C indicate the samples extracted for (R-Y) signal. Thus, alternate samples are used for (B-Y) and (R-Y), and color-difference signals (B-Y) and (R-Y) are accurately demodulated as shown in FIG. 13B and FIG. 13C.

In the digital chrominance signal demodulating device described above, a clock/control signal generator 100 is used for generating the system clock CP3 from the clock pulses CP1 in phase with the color burst signal. To produce clocks and control signals used for control over the digital chrominance signal demodulating circuit, the analog frequency multiplier 104 and the analog phase shifter 10S are required, so that the configuration of the entire chrominance signal demodulating device is complicated, and its cost is high.

Moreover, the carrier chrominance signal is A/D-converted at the timing of the system clock CP3, so that even if the clock pulses CP1 output from the PLL circuit 102 is in phase with the color burst signal, the system clock CP3 may not be accurately in phase with the color burst signal. As a result, accurate reproduction of the chrominance signal in the digital signal domain cannot be achieved.

SUMMARY OF THE INVENTION

An object of the invention is to simplify the configuration the circuit for producing clocks and control signals used in a digital chrominance signal demodulating device.

Another object of the invention are to provide a chrominance signal demodulating device which can accurately reproduce color-difference signals.

According to the invention, there is provided a digital chrominance signal demodulating device receiving a carrier chrominance signal having been obtained by converting an analog composite video signal comprising a luminance signal and a chrominance signal, into digital data, and then extracting a frequency component near the horizontal frequency of the color subcarrier, and outputting color-difference signals in the digital signal domain, said device comprising:

an identifying circuit for forming a selection signal for identifying one of the color-difference signals contained in the carrier chrominance signal, within a color burst signal period, on the basis of a system clock and a horizontal sync signal; and a selecting circuit for selecting the color-difference signals on the basis of the selection signal.

With this arrangement, the color-difference signals obtained by sampling in accordance with the system clock are always in phase with the color burst signal. Accordingly, the digital chrominance signal can be demodulated by the use of digital circuits forming the identifying circuit and the selecting circuit, which are less expensive. That is, the chrominance demodulation can be effected without using an analog phase shifter and a frequency multiplier, which are required in the conventional devices, so that the configuration of the circuit is simple, and the cost of the chrominance signal demodulating device is low.

The identifying circuit may comprise a waveform identifying circuit which identifies the waveform of the carrier chrominance signal on the basis of the data of the pixel of the carrier chrominance signal in question, and data in front of and at the back of the pixel in question.

With this arrangement, the identifying circuit for supplying the selection signal to the selection circuit can be formed of a simple circuit configuration.

The identifying circuit may further comprise a position detection circuit for detecting the position of said one of the color-difference signals within the color burst signal period.

With this arrangement, the selection signal can be generated by detecting the position of one of the color-difference signals. That is, the sampling pulses are made to be in phase with the color burst signal, and the color-difference signals are produced without fail.

Filters may be further provided to receive the color-difference signals output from the selecting circuit and having a function of a band-limiting the color-difference signals to a frequency one half the sampling frequency of the analog composite video signal.

With this arrangement, the harmonic components are removed from the color-difference signals, so that the color-difference signals consist of a smooth sinusoidal waveform.

A demodulation axis converter may be further provided to convert the carrier chrominance signal containing color-difference signals on (B-Y) and (R-Y) axes, into a carrier chrominance signal containing color-difference signals on I- and Q-axes, with said identifying circuit and said selecting circuit receiving the color-difference signals from said demodulation axis converter.

With this arrangement, the digital chrominance signal can be demodulated accurately with the use of a simple circuitry.

BRIEF DESCRIPTION OF THE DRAWINGS

In the drawings:

FIG. 5A to FIG. 5G are timing charts showing the operation of the identifying circuit shown in FIG. 2;

FIG. 6A to FIG. 6H are timing charts showing the operation of the selecting circuit shown in FIG. 2;

FIG. 12A to FIG. 12C are timing charts showing the chrominance signal demodulating operation in the conventional chrominance signal demodulating device; and FIG. 13A to FIG. 13C are diagrams showing the demodulating operation of the carrier chrominance signal.

DETAILED DESCRIPTION OF THE PREFERRED EMBODIMENTS

Embodiments of the invention will now be described with reference to the drawings.

Embodiment 1

Figure 1:
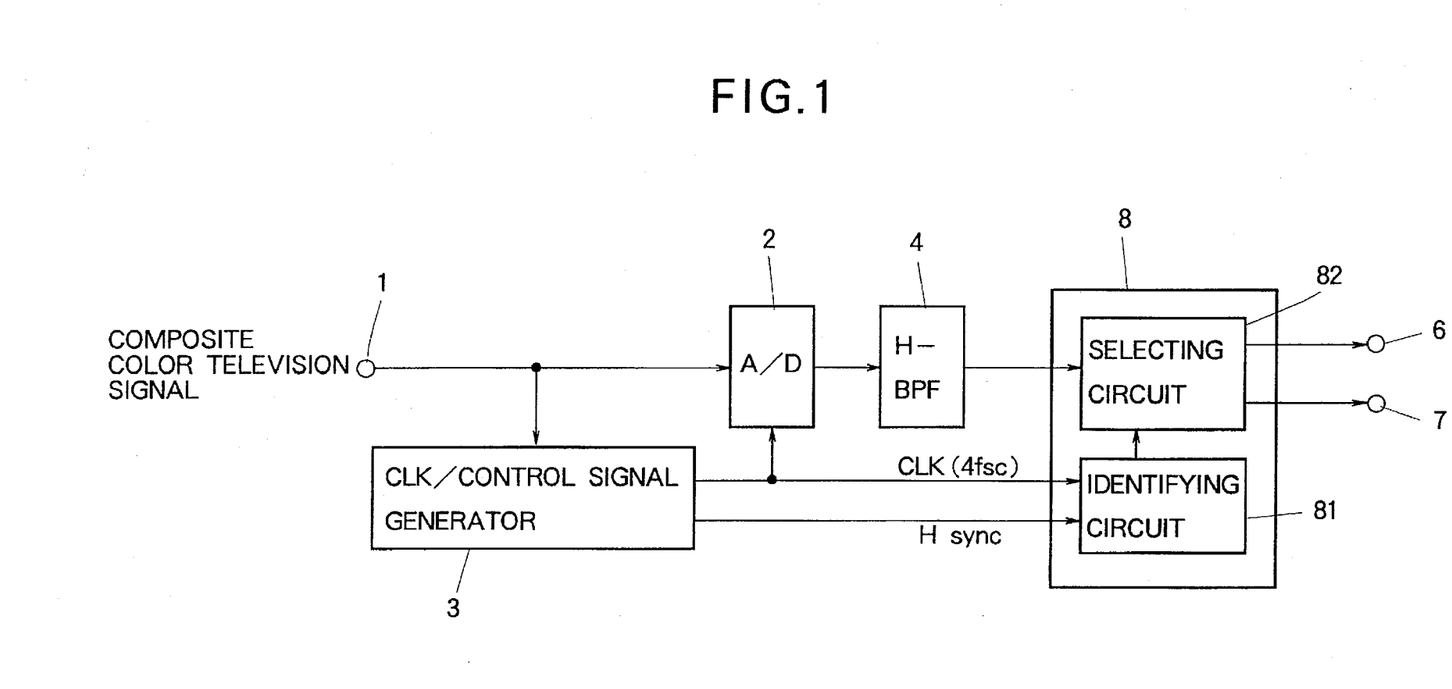
FIG. 1 is a block diagram showing the configuration of Embodiment 1.

FIG. 1 shows a digital chrominance signal demodulating device of Embodiment 1. In FIG. 1, reference numerals 1, 2, 4, 6 and 7 denote members identical to those in FIG. 11. Reference numeral 3 denotes a clock/control signal generator similar to the clock/control signal generator 100, but it does not produce the clock pulses of a frequency fsc, and it does produce a horizontal sync signal Hsync. Reference numeral 8 denotes a digital chrominance signal demodulating circuit, which comprises an identifying circuit 81 and a selecting circuit 82. The identifying circuit 81 generates a selection signal for identifying the color-difference signals contained in the carrier chrominance signal.

The selecting circuit 82 selects the color-difference signals from the carrier chrominance signal on the basis of the selection signal. Their details will be described next.

Figure 2:
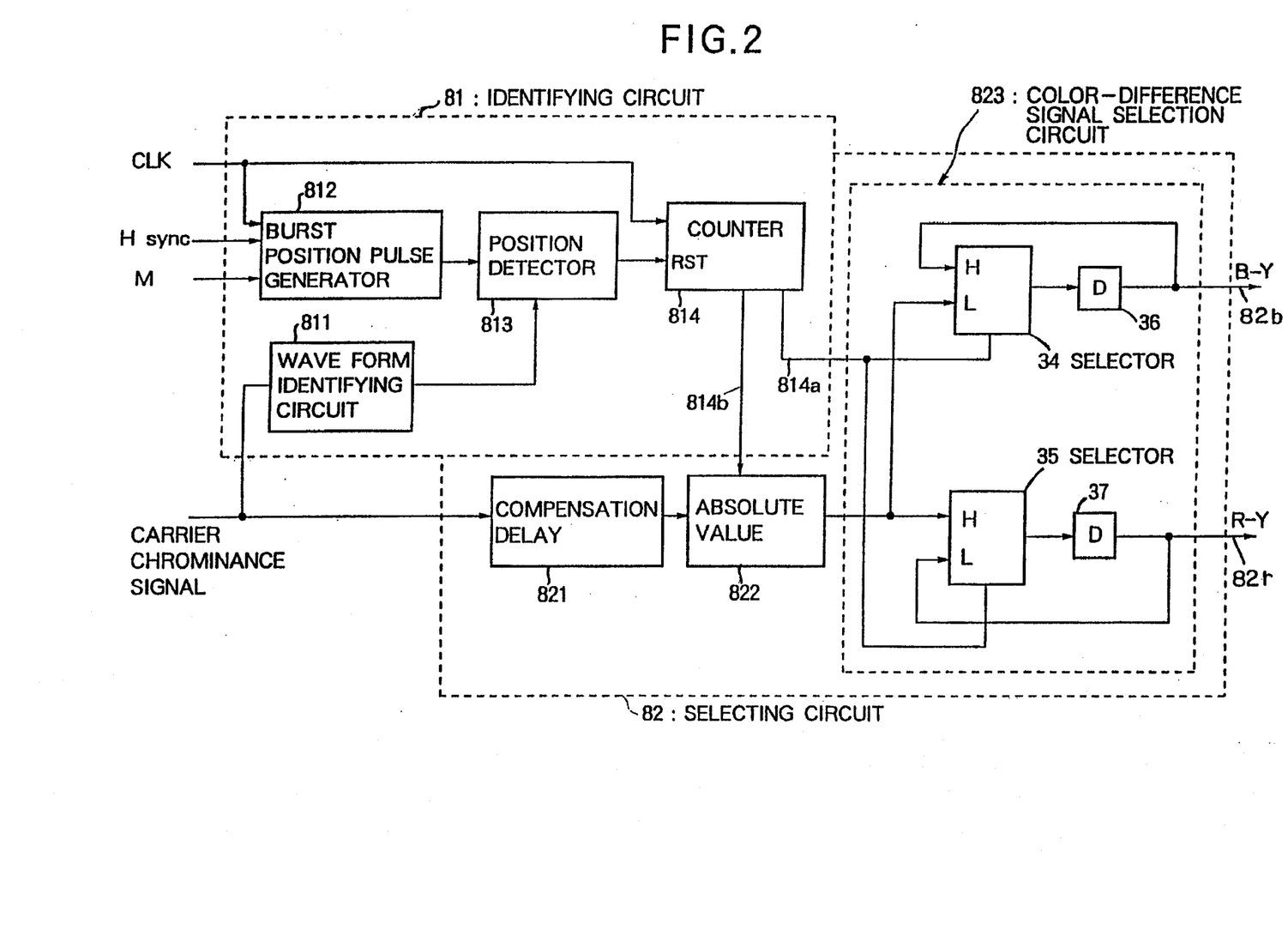
FIG. 2 is a block diagram showing the configuration of an example of an identifying circuit and selecting circuit in FIG. 1.

FIG. 2 is a block diagram showing the configuration of the identifying circuit 81 and the selecting circuit 82. As illustrated, the identifying circuit 81 comprises a waveform identifying circuit 811, a burst position pulse generator 812, a color-difference signal position detecting circuit 813, and a counter 814.

Figure 5A:
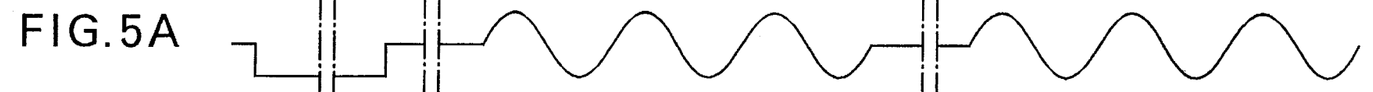
Figure 5B:
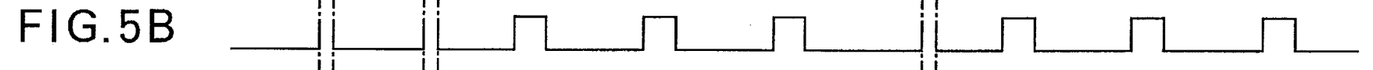

The waveform identifying circuit 811 receives the carrier chrominance signal (including the color burst signal during the color burst period), shown in FIG. 5A. It is noted that although FIG. 5A illustrates the carrier chrominance signal as an analog signal, the carrier chrominance signal as received by the waveform identifying circuit 811 is a digital signal, i.e., a sequence of digital data. FIG. 5A shows the carrier chrominance signal in analog form to show the relationship of the phase of the carrier chrominance signal and the pulses produced. The waveform identifying circuit 811 identifies the waveform of the carrier chrominance signal on the basis of the data of a pixel in question, and the data of pixels in front of and behind the pixel in question. That is, the waveform identifying circuit 811 outputs pulses (FIG. 5B) which rise or fall at a certain predefined phase angle of the carrier chrominance signal (including the color burst signal). In the example illustrated, the pulses output from the color-difference signal position detecting circuit 813 rise at the positive peaks of the carrier chrominance signal.

Figure 4:
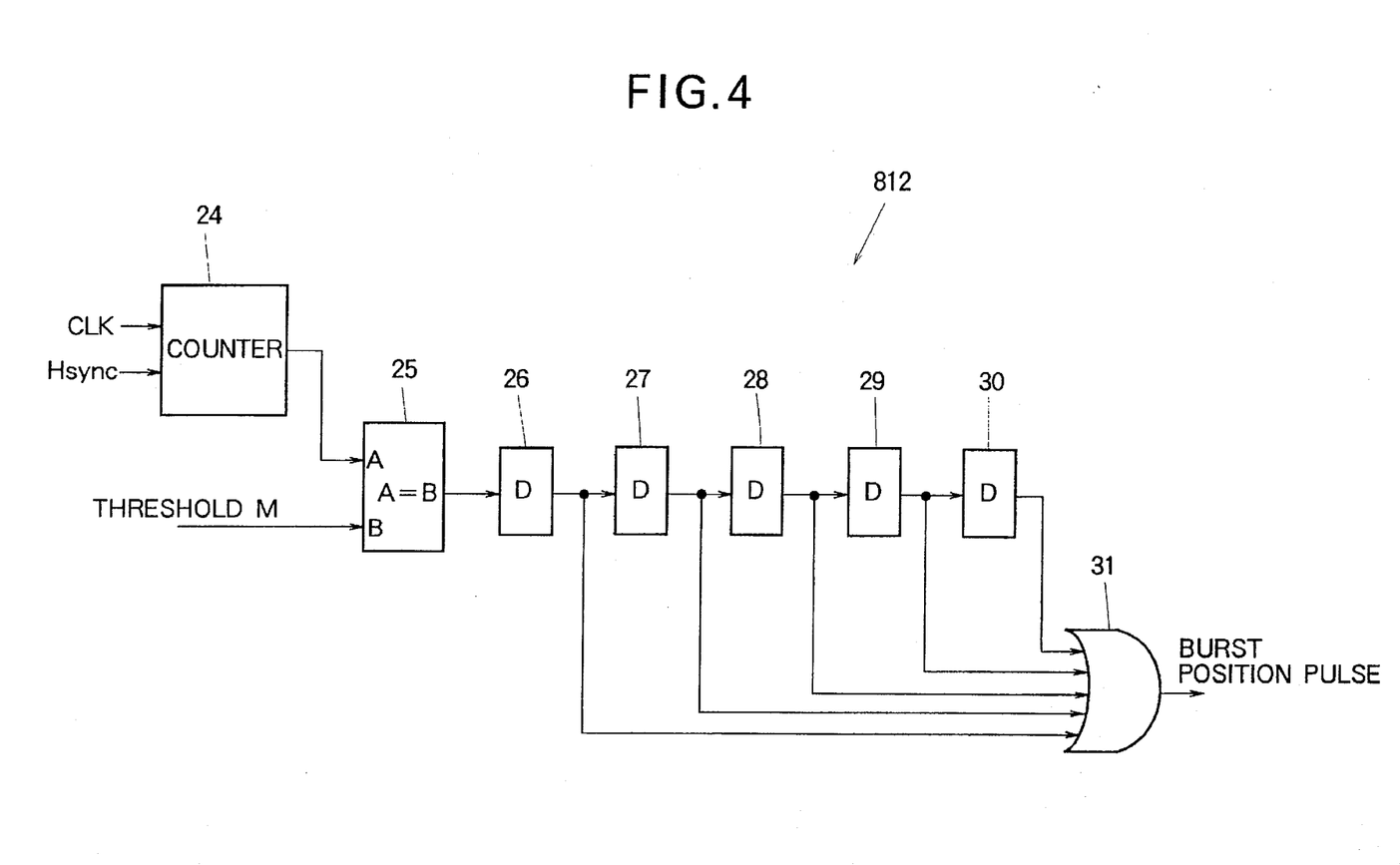
FIG. 4 is a block diagram showing the configuration of a burst position pulse generator forming part of the identifying circuit of FIG. 2.
Figure 5C:
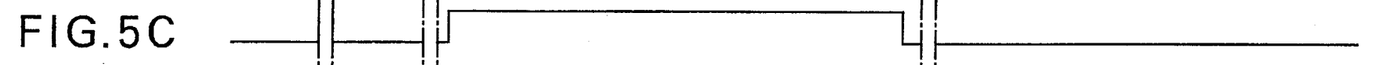
Figure 5D:
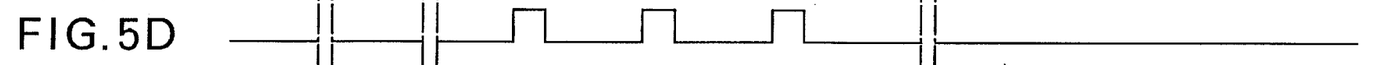
Figure 5E:
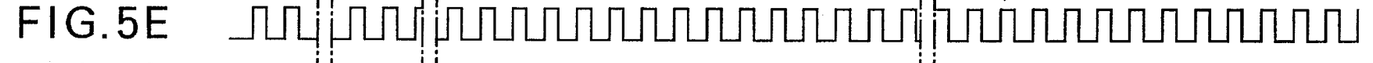

The burst position pulse generator 812 receives the horizontal sync signal Hsync and the system clock CLK of 4 fsc (FIG. 5E), and generates a burst position pulse (FIG. 5C) which is active for a period covering the entirety or part of each color burst period. Specifically, the burst position pulse rises when a first predetermined number of clock pulses are input after the horizontal sync signal Hsync, and falls when a second predetermined number of clock pulses are input after the rise of the burst position pulse. Such a burst position pulse generator 812 is configured by inclusion of a counter counting the number of clock pulses and/or a series of delay circuits. An example of the burst position pulse generator is shown in FIG. 4, and will be described later.

The color-difference signal position detecting circuit 813 detects the position of the color-difference signal, e.g., the -(B-Y) signal, in the color burst signal period, in accordance with the burst position pulse and the pulses output from the waveform identifying circuit 811. That is, it outputs pulses (FIG. 5D) which rise or fall at a certain predefined phase angle of the color burst signal. In the example illustrated, the pulses output from the color-difference signal position detecting circuit 813 rise at the positive peaks (the timing of the -(B-Y) signal) of the color burst signal.

Figure 5F:
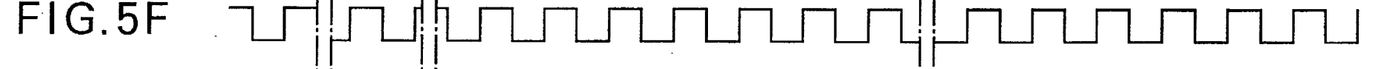
Figure 5G:
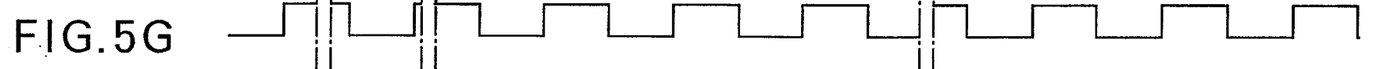
Figure 6A:
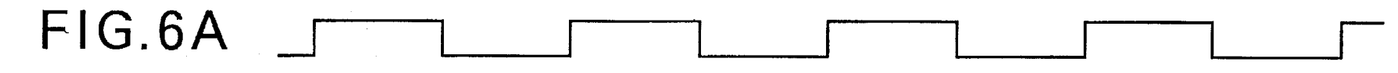
Figure 6B:
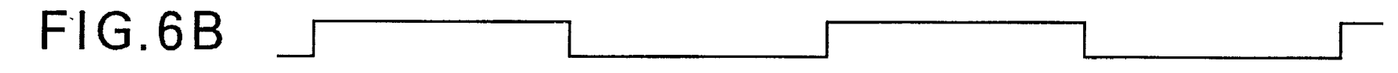

The counter 814 is reset by the output of the color difference signal, and counts the clocks CLK. A first output 814a (FIG. 5F, FIG. 6A) is a binary signal representing the LSB of the count value and has a frequency (2 fsc) one half the clock frequency 4 fsc of the system clock CLK. A second output 814b (FIG. 5G, FIG. 6B) is a binary signal representing the second least significant bit and a frequency (fsc) a quarter of the clock frequency 4 fsc. The first and second outputs 814a and 814b of the counter 814 are in phase with the system clock pulses CLK and also with the output of the clock-difference signal position detector 813, and are supplied as control signals to the selector 82.

Figure 3:
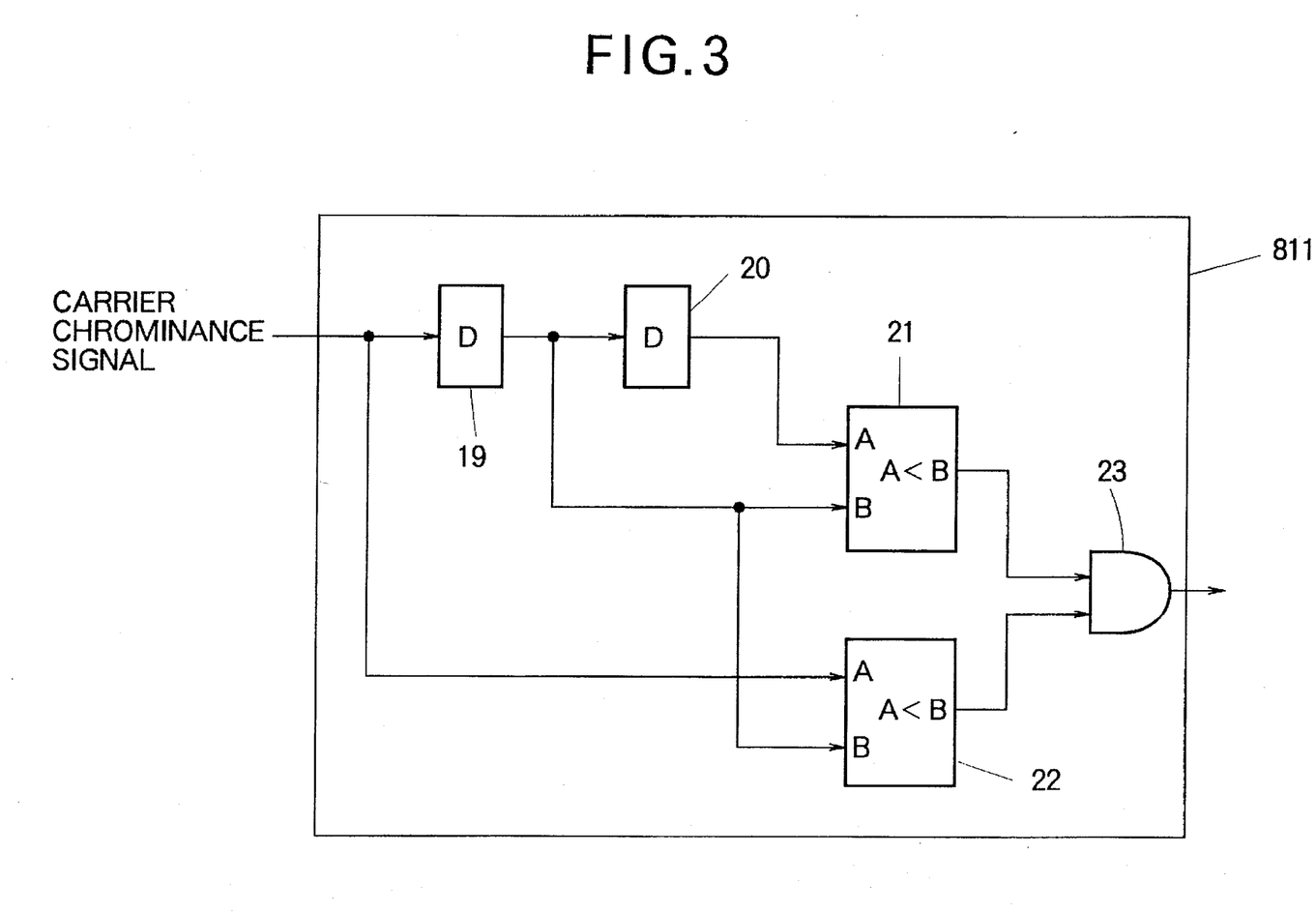
FIG. 3 is a block diagram showing the configuration of a waveform identifying circuit forming part of the identifying circuit of FIG. 2.

FIG. 3 shows an example of the waveform identifying circuit 811. It comprises D-type flip-flops 19 and 20, comparators 21 and 22, and an AND circuit 23. Each of the D-type flip-flops 19 and 20 serve as delay means to delay its input by one clock period, i.e., by one pixel, and for that purpose, they receive clock pulses CLK, although not illustrated as such.

The D-type flip-flop 19 receives the carrier chrominance signal from the HBPF 4, and the pixel data delayed by one pixel is supplied to the next-stage D-type flip-flop 20, which also delays its input by one pixel. As a result, if the output of the D-type flip-flop 19 represents a certain pixel (a pixel in question or an attentional pixel), the input of the D-type flip-flop 19 and the output of the D-type flip-flop 20 represent the pixels adjacent (at the back of and in front of) the above-mentioned certain pixel. The comparator 21 receives the outputs of the D-type flip-flops 20 and 19 as its first and second inputs A and B, and compares them. The output of the comparator 21 is high when A<B, and is otherwise low. The comparator 22 receives the carrier chrominance signal as its first input A, and the output of the D-type flip-flop 19 as its second input B, and compares them. The output of the comparator 22 is high when A<B, and is otherwise low.

The outputs of the comparators 21 and 22 are input to the AND gate 23, whose output is high when the outputs of the comparators 21 and 22 are both high. That is, the output of the AND gate 23 is high when the output of the D-type flip-flop 19 represents a pixel near a positive peak of the carrier chrominance signal (the color burst signal). The output of the AND gate 23 is supplied to the color-difference signal position detecting circuit 813, which also receives the burst position pulse from the burst position pulse generator 812, and generates a selection signal not only in the color burst signal period, but also outside the color burst signal period.

FIG. 4 shows an example of the burst position pulse generator 812. It comprises a counter 24, a comparator 25, cascaded D-type flip-flops 26 to 30 and an OR circuit 31. The counter 24 receives the system clock CLK and the horizontal sync signal Hsync from the clock/control signal generator 3, and counts the system clock pulses CLK during the color burst period. The comparator 25 receives the count value as its first input A, and a predetermined threshold M as its second input B, and compare them. The output of the comparator 25 is high when A=B, and is otherwise low. Thus, the output of the comparator 25 rises when the count value of the counter 24 A=B. The output of the comparator 25 is supplied to the cascaded D-type flip-flops 26 to 30, and the outputs of the D-type flip-flops 26 to 30 are all input to the OR gate 31. When at least one of the outputs of the D-type flip-flops 26 to 30 is high, the output of the OR gate 31 is high. It therefore goes high one clock after the count value of the counter 24 reaches the predetermined value M.

The period for which the output of the OR gate 31 is high is determined by the number of the cascaded flip-flops 26 to 30, which in this case is five. Thus, the threshold M determines the first predetermined number mentioned earlier and the number of the cascaded flip-flops 26 to 30 determines the second predetermined number mentioned earlier.

The output of the OR gate 31 forms the output of the burst position pulse generator 812.

Returning again to FIG. 2, the selecting circuit 82 comprises a compensation delay circuit 821, an absolute value circuit 822, and a color-difference signal selection circuit 823.

The compensation delay circuit 821 delays its input by a predetermined number of clocks to compensate for the delay in the carrier chrominance signal through the identifying circuit 81, so that the control signals 814a and 814b from the identifying circuit 81 and the output of the compensation delay circuit 821 are in time with each other.

Figure 6C:
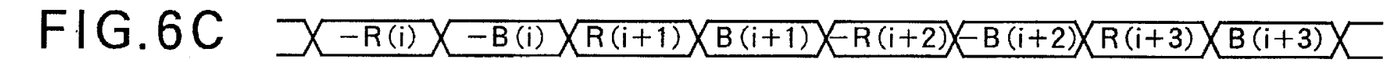

The absolute value circuit 822 receives the output (FIG. 6C) of the compensation delay circuit 821 and inverts its polarity when the signal 814b (FIG. 6B) from the counter 814 is high, and outputs its input signal without polarity change when the control signal 814b is low.

The color-difference signal selection circuit 823 receives the output of the absolute value circuit 821, and the control signal 814a from the identifying circuit 81, and outputs a succession of (B-Y) signals (FIG. 6F) at its first output terminal 82r, and a succession of (R-Y) signals (FIG. 6H) at its second output terminal 82b.

The color-difference signal selection circuit 823 comprises first and second selectors 34 and 35, and D-type flip-flops 36 and 37 respectively connected to the outputs of the selectors 34 and 35.

Each of the selectors 34 and 35 has two input terminals H and L. The selector 34 receives, at its L input terminal, the output of the absolute value circuit 822, and at its H input terminal, the output of the D-type flip-flop 36, which is obtained by delaying the output of the selector 34 by one clock (CLK) period. The selector 35 receives, at its H input terminal, the output of the absolute value circuit 822, and at its L input terminal, the output of the D-type flip-flop 37, which is obtained by delaying the output of the selector 35 by one clock (CLK) period. When the control signal 814a is high, each of the selectors outputs the input at the input terminal H, and when the control signal is low, it outputs the input at the input terminal L.

Figure 6D:
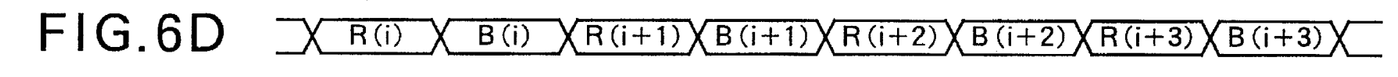
Figure 6E:
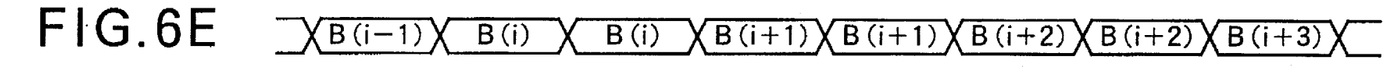
Figure 6F:
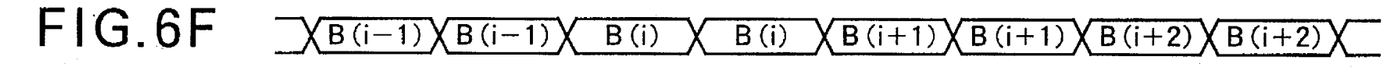
Figure 6G:
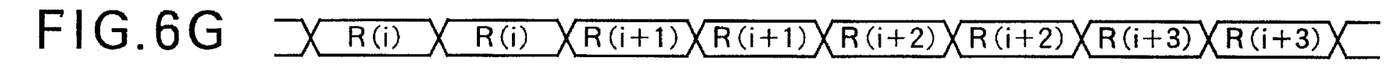
Figure 6H:
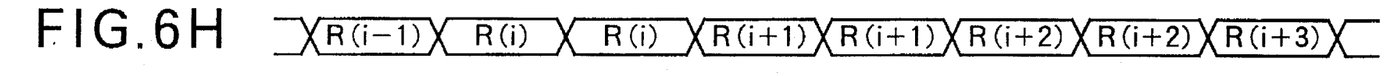

Accordingly, the selector 34 selects the output (FIG. 6D) of the absolute value circuit 822 when the control signal 814a (FIG. 6A) is low, and maintains the output of the D-type flip-flop 36 when the control signal 814a is high, to provide an output signal as shown at FIG. 6E so that the output of the D-type flip-flop 36 is as shown at FIG. 6F. On the other hand, the selector 35 selects the output (FIG. 6D) of the absolute value circuit 822 when the control signal 814a is high, and maintains the output of the D-type flip-flop 37 when the control signal 814a is low, to provide an output signal as shown in FIG. 6G so that the output of the D-type flip-flop 37 is as shown at FIG. 6H. The two outputs of the color-difference signal selection circuit 823 are the color difference signals R-Y and B-Y of the digital chrominance signal demodulating device.

The color-difference signals are obtained as a product of the carrier chrominance signal and the color subcarrier, so that when the carrier chrominance signal is demodulated at 90°, the color-difference signal (R-Y) is obtained in accordance with the following equation:

$$(R-Y) = A \sin \omega ct * (-\sin \omega sct)$$

where ωc and ωsc are angular frequency of the carrier chrominance signal and the color subcarrier, and A represents the amplitude of the carrier chrominance signal.

The right side of the equation can be rewritten as:

(R-Y)=A sin (ωsc−ωa)t * (−sin ωsct)

It can be further written as:

(R-Y)=A (sin ωsct * cos ωat

−cos ωsct * sin ωat) * (−sin ωsct)

If the color-difference signal is sampled by a clock having a frequency (4 fsc) four times the frequency of the color subcarrier, and at such a timing that:
sin ωsct=1
cos ωsct=0
then, the color-difference signal is given by:
(R-Y)=A sin ωat
Similarly, if the color-difference signal is sampled by a 90° phase-shifted clock having a frequency (4 fsc) four times the frequency of the color subcarrier, and at such a timing that:
sin ωsct=0
cos ωsct=1
then, the color difference signal (B-Y) is given by:
(B-Y)=A sin ωat
In the above description, it is assumed that (R-Y) and (B-Y) differ in the angle of demodulation by 90° from each other. The phases of the color difference signal (B-Y) and the subcarrier are 180° apart from each other. The chrominance demodulation can be achieved using a similar configuration for IQ demodulation, as will be more apparent from the description of Embodiment 3.

Embodiment 2

Figure 7:
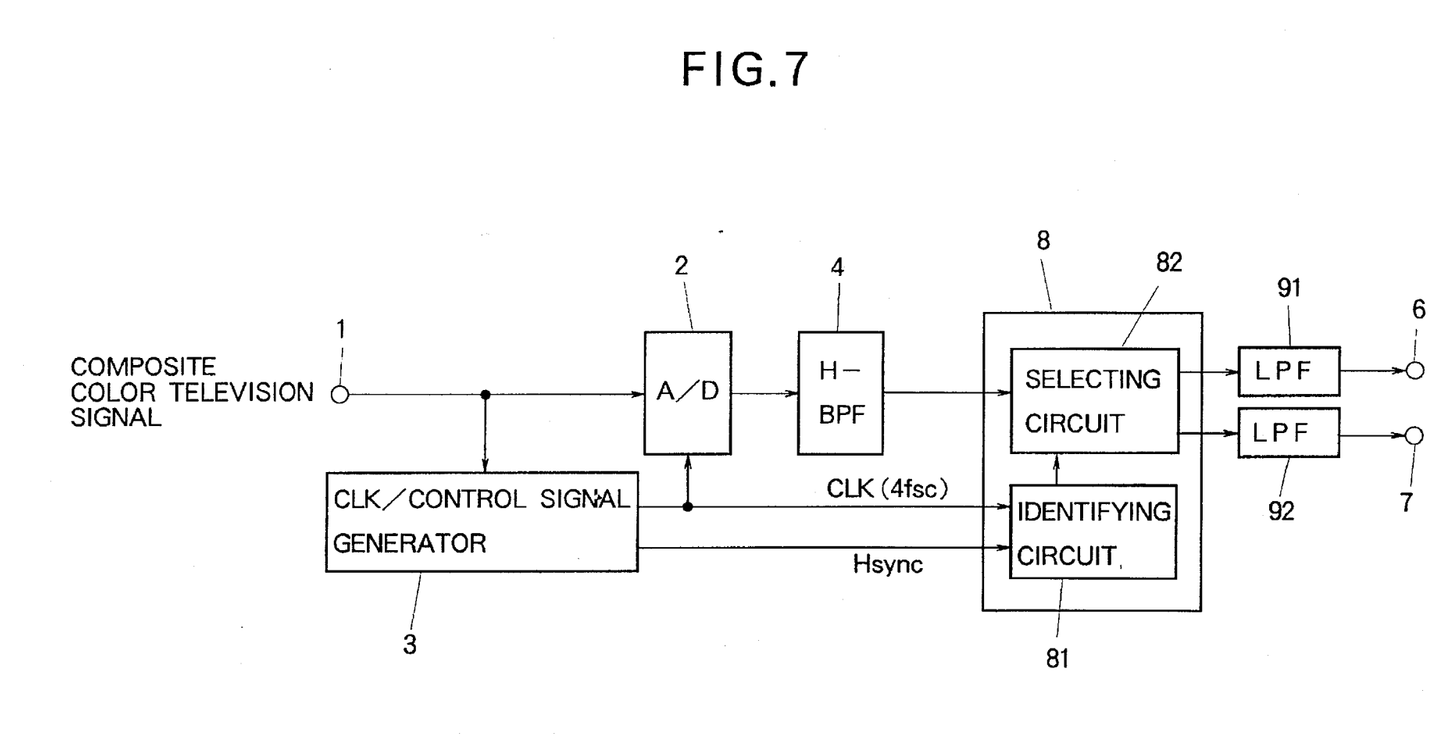
FIG. 7 is a block diagram showing the configuration of Embodiment 2.

FIG. 7 shows a digital chrominance signal demodulating device of another embodiment of the invention. The configuration shown in FIG. 7 is generally identical to that of FIG. 1, and the only difference is that LPFs 91 and 92 are provided between the output of the demodulating circuit 8 and the output terminals 6 and 7. The filters 91 and 92 band-limit the frequency to up one half the sampling frequency.

Figure 8A:
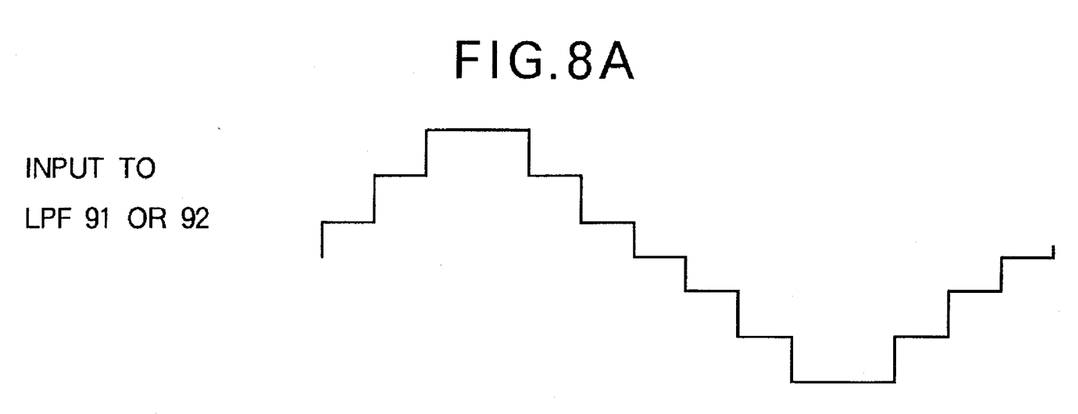
FIG. 8A and FIG. 8B are diagrams showing the waveform of the output signal in Embodiment 2.
Figure 8B:
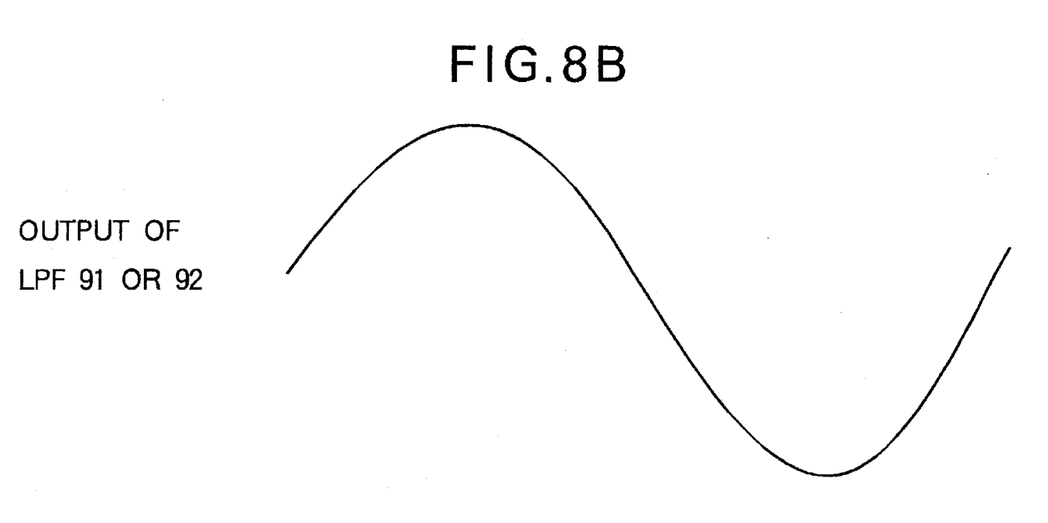

FIG. 8A and FIG. 8B respectively show the input and output of the filter 91 or 92.

The outputs of the demodulating circuits 8 contain harmonics centered on and near the frequency half the sampling frequency. From the view of the frequency band of the color-difference signals, it is desirable for the filters to have a cut-off frequency of about 1 MHz. However, the hardware configuration of digital filters having such a cut-off frequency is complicated. Here, a digital filter having a cut-off frequency at one half the sampling frequency is used. By the use of such a digital filter, harmonics can be removed, and the quality of the picture can be improved considerably.

Embodiment 3

Figure 9:
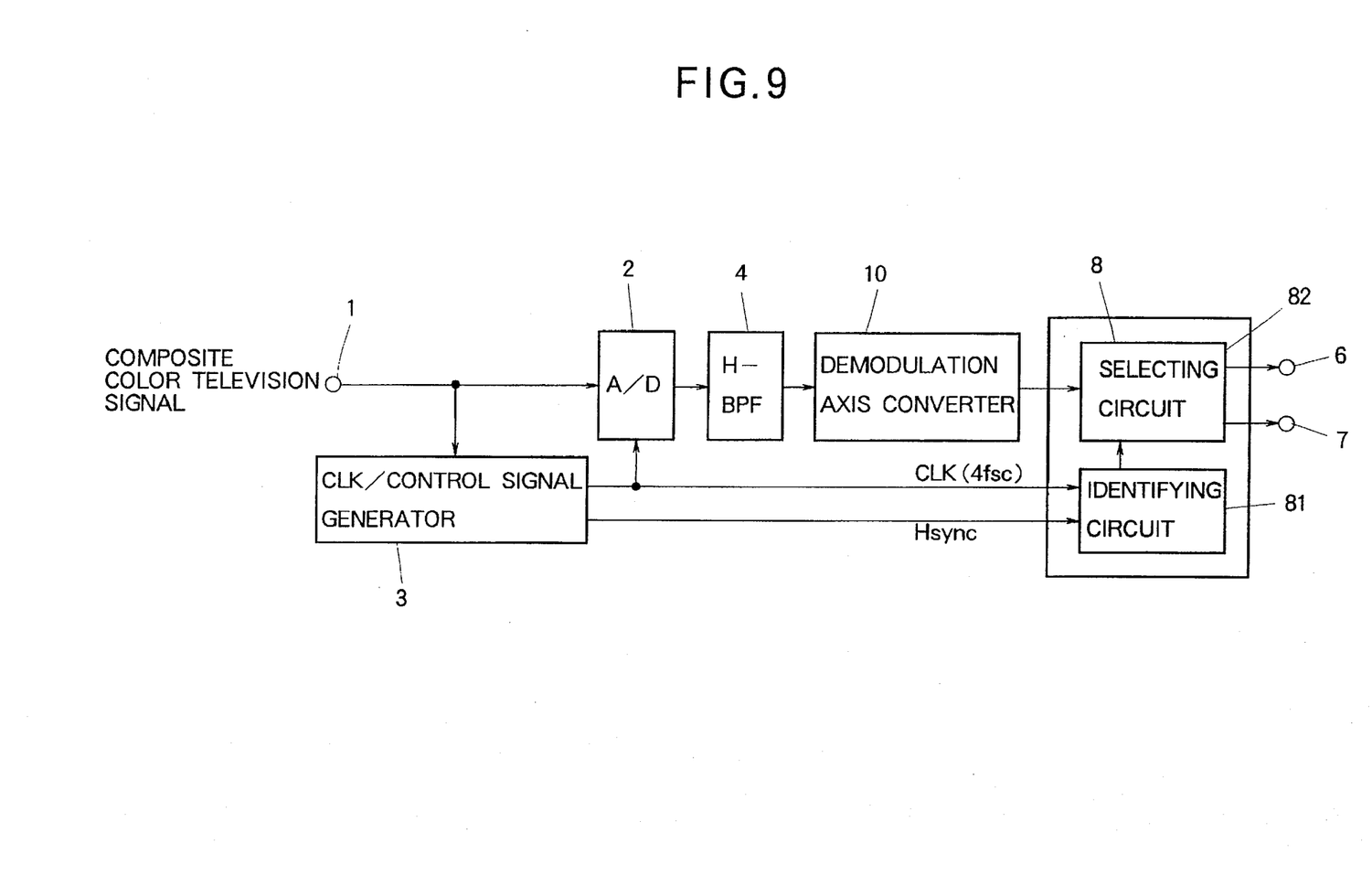
FIG. 9 is a block diagram showing the configuration of Embodiment 3.

FIG. 9 shows a chrominance signal demodulating device of a further embodiment of the invention. The configuration shown in FIG. 9 is generally identical to that of FIG. 1, and the only difference is that a demodulation axis converter 10 is inserted between the HBPF 4 and the chrominance signal demodulating circuit 8. The demodulation axis converter 10 converts the carrier chrominance signal containing color-difference signals on (B-Y) and (R-Y) axes, into a carrier chrominance signal containing color-difference signals on I- and Q-axes.

Figure 10:
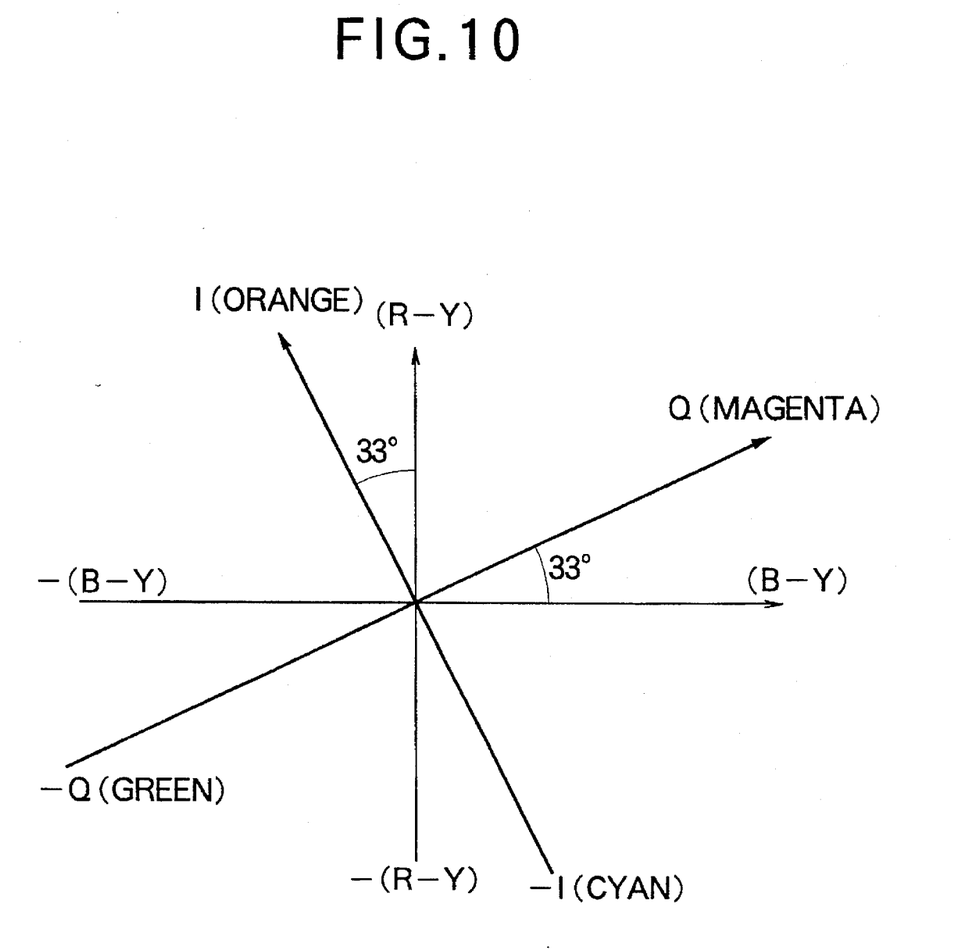
FIG. 10 is a diagram showing the phase of the chrominance demodulation in Embodiment 3.

Since the chrominance signal demodulating device 8 demodulates the carrier chrominance signal with a phase difference of 90°, the reference points are taken to be at the edges of -(B-Y) in Embodiment 1. FIG. 10 shows the phase relationship between the demodulation axes. It shows that (B-Y) axis is 90° apart from the (R-Y) axis, and the Q axis is 90° apart from the I axis, and the phase difference between (R-Y) and I, or between (B-Y) and Q is 33°. Accordingly, by shifting the phase of the carrier chrominance signal output from the HBPF 4 by 33°, the I- and Q-axis color-difference signals can be obtained, and can be used for the chrominance signal demodulation.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A digital chrominance signal demodulating device receiving a carrier chrominance signal, the carrier chrominance signal having been obtained by converting an analog composite video signal comprising a luminance signal and a chrominance signal into a digital composite video signal and then extracting a frequency component near the horizontal frequency of a color subcarrier of the digital composite video signal, and outputting color-difference signals in the digital signal domain, the digital chrominance signal demodulating device comprising:

an identifying circuit for forming a selection signal for identifying one of color-difference signals contained in the carrier chrominance signal, within a color burst signal period, on the basis of a system clock and a horizontal sync signal; and a selecting circuit for selecting the color-difference signals for output from the digital chrominance signal demodulating device on the basis of the selection signal.

2. The digital chrominance signal demodulating device according to claim 1, wherein said identifying circuit comprises a waveform identifying circuit which identifies a waveform of the carrier chrominance signal on the basis of pixel data of the carrier chrominance signal, the pixel data comprising data of an attentional pixel and data of a pixel in front of and data of a pixel behind the attentional pixel.

3. The digital chrominance signal demodulating device according to claim 2, wherein said identifying circuit further comprises a position detection circuit for detecting a position of said one of color-difference signals within the color burst signal period.

4. The digital chrominance signal demodulating device according to claim 1, further comprising filters receiving the color-difference signals output from said selecting circuit and having a function of band-limiting the color-difference signals to a frequency one half a sampling frequency of the analog composite video signal.

5. The digital chrominance signal demodulating device according to claim 1, further comprising a demodulation axis converter for converting the carrier chrominance signal containing the color-difference signals on (B-Y) and (R-Y) axes, into a carrier chrominance signal containing color-difference signals on I- and Q-axes, said identifying circuit and said selecting circuit receiving the color-difference signals on the I- and Q-axes from said demodulation axis converter.

6. A method of demodulating a received carrier chrominance signal to provide digital color-difference signals, the received carrier chrominance signal having been obtained by converting an analog composite video signal comprising a luminance signal and a chrominance signal into a digital composite video signal and then extracting a frequency component near a horizontal frequency of a color subcarrier of the digital composite video signal, the method of demodulating comprising:

a) generating a selection signal for identifying one of the digital color-difference signals contained in the received carrier chrominance signal, within a color burst signal period, on the basis of a system clock and a horizontal sync signal; and b) selecting the digital color-difference signals on the basis of the selection signal.

7. The method of demodulating according to claim 6, wherein said step a) of generating a selection signal comprises identifying a waveform of the carrier chrominance signal on the basis of pixel data of the carrier chrominance signal, the pixel data comprising data of an attentional pixel and data of a pixel in front of and data of a pixel behind the attentional pixel.

8. The method of demodulating according to claim 7, wherein said step a) of generating a selection signal further comprises detecting a position of the one of the digital color-difference signals within the color burst signal period.

9. The method of demodulating according to claim 6, further comprising:

c) filtering the digital color-difference signals selected in said step (b) of selecting and band-limiting the digital color-difference signals to a frequency one half a sampling frequency of the analog composite video signal.

10. The method of demodulating according to claim 6, further comprising converting the digital carrier chrominance signal containing the digital color-difference signals on (B-Y) and (R-Y) axes into a carrier chrominance signal containing color-difference signals on I- and Q-axes, said step a) of generating a selection signal and said step b) of selecting the digital color-difference signals occurring after extraction of a frequency component near a horizontal frequency of the color subcarrier.

11. A chrominance signal demodulator for extracting color difference signals from a carrier chrominance signal derived from a composite video signal, the chrominance signal demodulator comprising:

identification means for generating a selection signal for identifying the color difference signals of the carrier chrominance signal in accordance with a system clock and a horizontal synchronization signal extracted from the composite video signal; and selection means for selecting the color difference signals of the carrier chrominance signal as outputs of the chrominance signal demodulator in accordance with the selection signal.

12. The chrominance signal demodulator of claim 11, said identification means comprising:

waveform identification means, coupled to the carrier chrominance signal, for generating a waveform pulse signal having pulses corresponding to positive peaks of the carrier chrominance signal;

burst position pulse generation means for generating a burst position pulse signal indicative of a color burst period of the carrier chrominance signal in accordance with the system clock and the horizontal synchronization signal;

color difference position detection means, coupled to said waveform identification means and said burst position identification means, for detecting a position of a first of the color difference signals of the carrier chrominance signal and for outputting a color difference position signal indicative thereof in accordance with the waveform pulse signal and the burst position pulse signal; and counter means, coupled to said color difference position detection means, for counting a count value of the system clock and being reset in accordance with the color difference position signal to output the count value as the selection signal.

13. The chrominance signal demodulator of claim 12, wherein said counter means outputs a least significant bit of the count value as the selection signal and a second least significant bit of the count value as a further selection signal, said selection means comprising:

compensation delay means for delaying the carrier chrominance signal to compensate for delay attributable to generation of the selection signal and the further selection signal by said identification means; and absolute value means, coupled to said delay means and said counter means, for outputting the delayed carrier chrominance signal when the further selection signal is a first value and an inverted delayed carrier chrominance signal when the further selection signal is a second value.

14. The chrominance signal demodulator of claim 13, wherein said selection means further comprises:

first selection means, having a first input coupled to an output of said absolute value means and a second input, for selecting as a first output either the output of said absolute value means applied to the first input or a signal coupled to the second input in accordance with the selection signal;

first delay means, coupled to said first selection means, for delaying the first output to provide as an output of the chrominance signal demodulator the first of the color difference signals and for applying the first of the color difference signals to the second input of said first selection means;

second selection means, having a first input coupled to the output of said absolute value means and a second input, for selecting as a second output either the output of said absolute value means applied to the first input or a signal coupled to the second input in accordance with the selection signal; and second delay means, coupled to said second selection means, for delaying the second output to provide as an output of the chrominance signal demodulator a second of the color difference signals and for applying the second of the color difference signals the second input of said second selection means.

15. The chrominance signal demodulator of claim 11, further comprising:

analog/digital conversion means for converting the composite video signal into a digital composite video signal;

extraction means, coupled to said analog/digital conversion means, for extracting a frequency component of the digital composite video signal near a horizontal frequency of a color subcarrier of the digital composite video signal and for providing the extracted frequency component as the carrier chrominance signal; and filter means for band-limiting the color difference signals output from said selection means to a frequency one-half a sampling frequency of said analog/digital conversion means.

16. The chrominance signal demodulator of claim 11, further comprising:

analog/digital conversion means for converting the composite video signal into a digital composite video signal;

extraction means, coupled to said analog/digital conversion means, for extracting a frequency component of the digital composite video signal near a horizontal frequency of a color subcarrier of the digital composite video signal and for providing the extracted frequency component as the carrier chrominance signal; and demodulation axis conversion means, coupled to said extraction means, for converting the carrier chrominance signal containing the color difference signals on (B-Y) and (R-Y) axes into a carrier chrominance signal containing color difference signals on I- and Q-axes and for providing the converted carrier chrominance signal to said identification means as the carrier chrominance signal.

17. A method of demodulating a carrier chrominance signal derived from a composite video signal to extract color difference signals, the method of demodulating a carrier chrominance signal comprising the steps of:

(a) generating a selection signal for identifying the color difference signals of the carrier chrominance signal in accordance with a system clock and a horizontal synchronization signal extracted from the composite video signal; and (b) selecting the color difference signals of the carrier chrominance signal as outputs in accordance with the selection signal.

18. The method of demodulating a carrier chrominance signal of claim 17, said step (a) of generating comprising:

(a1) generating a waveform pulse signal having pulses corresponding to positive peaks of the carrier chrominance signal based on the carrier chrominance signal;

(a2) generating a burst position pulse signal indicative of a color burst period of the carrier chrominance signal in accordance with the system clock and the horizontal synchronization signal;

(a3) detecting a position of a first of the color difference signals of the carrier chrominance signal and providing a color difference position signal indicative thereof in accordance with the waveformpulse signal and the burst position pulse signal; and (a4) counting a count value of the system clock to provide the count value as the selection signal, said step (a4) of counting being reset in accordance with the color difference position signal.

19. The method of demodulating a carrier chrominance signal of claim 18, wherein said step (a4) of counting comprises providing a least significant bit of the count value as the selection signal and a second least significant bit of the count value as a further selection signal, said step (b) of selecting comprising:

(b1) delaying the carrier chrominance signal to compensate for delay attributable to generation of the selection signal and the further selection signal; and (b2) providing the delayed carrier chrominance signal as an output when the further selection signal is a first value and providing an inverted delayed carrier chrominance signal as an output when the further selection signal is a second value.

20. The method of demodulating a carrier chrominance signal of claim 19, wherein said step (b) of selecting further comprises:

(b3) selecting as a first output either the output of said step (b2) or a second input in accordance with the selection signal;

(b4) delaying the first output to provide as an output the first of the color difference signals and providing the first of the color difference signals as the second input of said step (b3);

(b5) selecting as a second output either the output of said step (b2) or a third input in accordance with the selection signal; and (b6) delaying the second output to provide as an output a second of the color difference signals and providing the second of the color difference signals as the third input of said step (b5).

\* \* \* \* \*